N. M. HARTZELL.
FURNACE.
APPLICATION FILED JAN. 22, 1921.
1,414,276.
Patented Apr. 25, 1922.
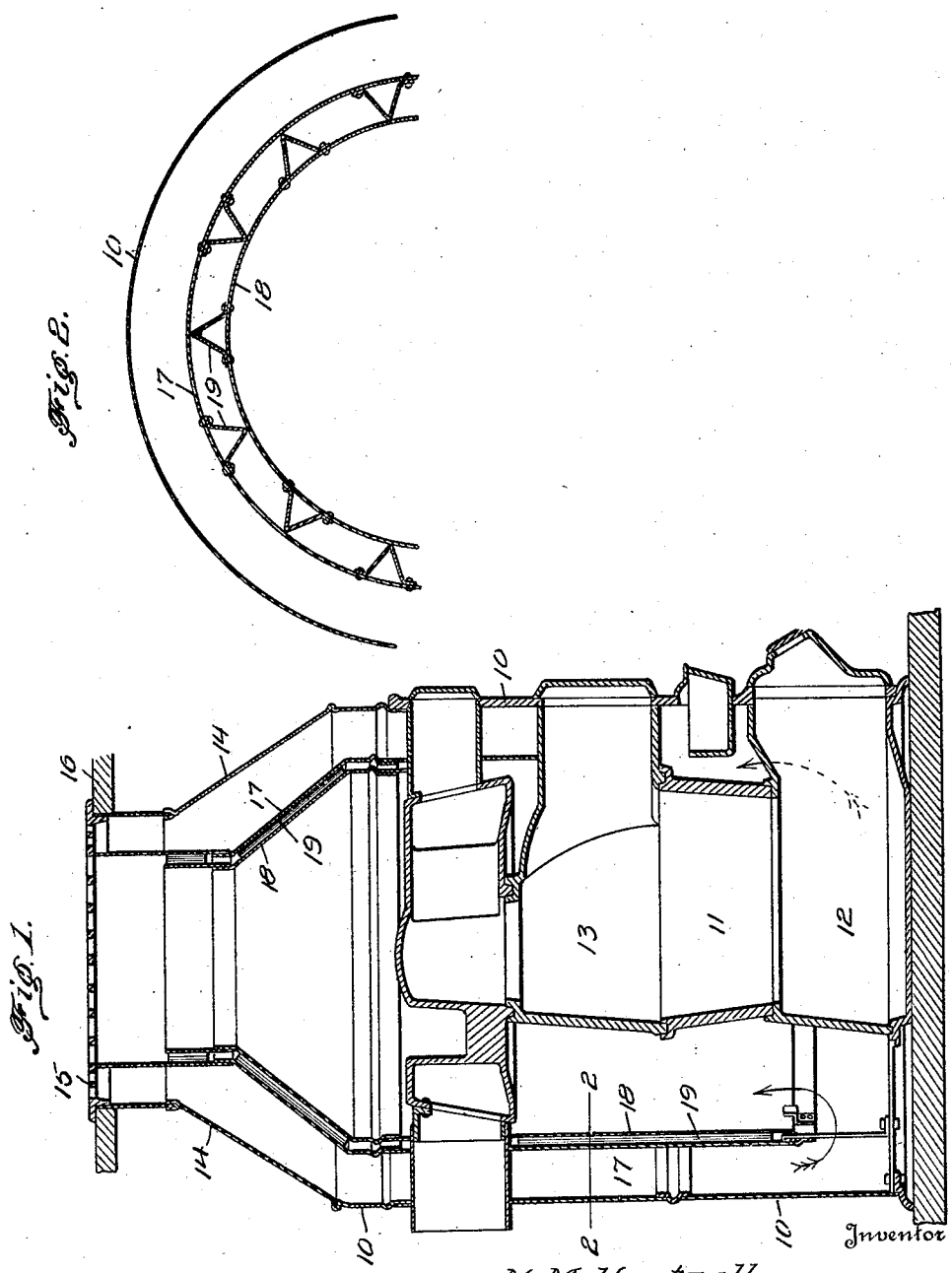
Inventor
N. M. Hartzell.
By
Geo. P. Kimmel. Attorney

UNITED STATES PATENT OFFICE.

NOBLE MARK HARTZELL, OF PHILADELPHIA, PENNSYLVANIA.

FURNACE.

1,414,276.   Specification of Letters Patent.   Patented Apr. 25, 1922.

Application filed January 22, 1921. Serial No. 439,227.

*To all whom it may concern:*

Be it known that I, NOBLE MARK HARTZELL, a citizen of the United States, residing at Philadelphia, in the county of Philadelphia and State of Pennsylvania, have invented certain new and useful Improvements in Furnaces, of which the following is a specification.

This invention relates to improvements in furnaces of the class of pipeless furnaces, and has for one of its objects to provide a simply constructed device whereby the operation is improved and the efficiency increased without material addition to the expense of construction.

With this and other objects in view, the invention consists in certain novel features of construction as hereafter shown and described, and then specifically pointed out in the claims, and in the drawing illustrative of the preferred embodiment of the invention.

Figure 1 is a vertical sectional elevation.

Figure 2 is an enlarged transverse section on the line 2—2 of Figure 1.

The improved device is adapted to be applied to any of the classes of hot air furnaces constructed of an outer casing or shell, a combustion chamber within the shell, and an inner or intermediate casing formed of spaced walls and constituting an insulating air chamber between the outer casing and the combustion chamber, or between the upwardly flowing warm air currents and the downwardly flowing cold or return air currents.

The present invention comprises a plurality of vertically arranged combined division and stay or supporting members extending betwen the walls of the inner casing and producing a corresponding plurality of vertically directed smaller chambers which not only support the walls of the inner casing and prevent them from collapsing, but likewise divide the insulating chamber into a plurality of independent portions or units, and confining the air therein in the smaller chambers, and thus equalizing the temperature and preventing the passage of the confined air from one side to the other of the casing.

An insulating "blanket" or "baffle" is thus provided between the warm air and cold air currents, and of uniform temperature throughout.

The invention therefore comprises a plurality of V shaped division members attached alternately to the walls of the inner casing so that the requisite longitudinal air pockets are formed between the walls of the inner casing without attaching the casing members to each other.

In the drawing illustrative of the embodiment of the invention, the outer casing or shell is represented at 10, the fire pot at 11, the ash pit at 12, and the combustion chamber at 13. The outer casing is converged at 14 and communicates with a register device 15 in the floor 16.

The inner casing comprises an outer wall 17 and inner wall 18, and is located between the outer casing 10 and the fire pot 11 and the combustion chamber 13, as shown. The outer wall 17 of the inner casing extends to the register 15, while the inner wall 17 is spaced from the register at the upper edge as shown. The air heated by the radiation from the combustion chamber passes upwardly between the combustion chamber and the inner casing, and thence through the central part of the register, while the cold or cooler air passes downwardly through the outer part of the register, and thence between the outer and inner casing and thence beneath the latter as indicated by the arrows in Figure 1.

Located between the walls 17—18 of the inner casing are a plurality of vertically directed combined dividing and stay members 19, in spaced relation, as shown more clearly in Figures 2 and 3.

The division members 19 are preferably formed in V-shape transversely, as shown in Fig. 2 with each alternate division member attached by its base to the outer wall 17 of the inner casing and in contact by its apex with the inner wall 18 but not attached to the inner wall and the other alternating division members each attached by its base to the inner wall 18 and in contact by its apex with the inner wall but not attached thereto.

The members 19 thus divide the space between the walls 17 and 18 into a plurality of relatively small vertical chambers, or air pockets which effectually prevent the confined air from passing laterally between the walls of the inner casing. By this arrangement the spaced walls 17 and 18 are reinforced and supported while at the same time not positively connected, so that they will not warp or twist under the influence of the heat. The temperature of the "pockets" of the inner casing is thus equalized so that the insulation is uniform over all portions of the inner case.

The members 19 likewise form effectual stays or supports to prevent the collapse or expansion of the walls 17 and 18 of the inner casing.

The preferred embodiment of the invention is disclosed in the drawing and set forth in the specification, but it will be understood that any modification within the scope of the claimed invention may be made in the construction without departing from the principle of the invention or sacrificing any of its advantages.

Having thus described the invention, what is claimed as new is:

1. In a furnace, an inner wall member and an outer wall member in spaced relation, a plurality of bracing members in spaced relation between said walls, each alternate bracing member being attached to the inner wall and in free contact with the outer wall, and the other alternate bracing members attached to the outer wall and in free contact with the inner wall.

2. In a furnace, an inner wall member and an outer wall member in spaced relation, a plurality of V-shaped bracing members in spaced relation between said walls, each alternate bracing member being attached by its spaced ends to the inner wall and in free contact at its apex with the outer wall, and each other alternate bracing member attached by its spaced ends to the outer wall and in free contact by its apex with the inner wall.

NOBLE MARK HARTZELL.